US012699295B2

(12) United States Patent
Kim et al.

(10) Patent No.: US 12,699,295 B2
(45) Date of Patent: Aug. 4, 2026

(54) DISPLAY APPARATUS AND LIGHT SOURCE APPARATUS THEREOF BOTH INCLUDING SUPPORTERS WITH ADSORPTION PORTION

(71) Applicant: SAMSUNG ELECTRONICS CO., LTD., Suwon-si (KR)

(72) Inventors: Taeyeon Kim, Suwon-si (KR); Sungyeol Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/890,447

(22) Filed: Sep. 19, 2024

(65) Prior Publication Data

US 2025/0013100 A1     Jan. 9, 2025

Related U.S. Application Data

(63) Continuation of application No. PCT/KR2023/004980, filed on Apr. 13, 2023.

(30) Foreign Application Priority Data

May 24, 2022     (KR) ........................ 10-2022-0063703

(51) Int. Cl.
G02F 1/13357     (2006.01)
F21V 8/00        (2006.01)
(52) U.S. Cl.
CPC ..... *G02F 1/133608* (2013.01); *G02B 6/0088* (2013.01)

(58) Field of Classification Search
CPC ........................ G02B 6/0088; G02F 1/133608
See application file for complete search history.

(56) References Cited

U.S. PATENT DOCUMENTS

| | | | |
|---|---|---|---|
| 6,631,557 B2 | 10/2003 | Ogimoto | |
| 7,855,760 B2 | 12/2010 | Tsumura et al. | |
| 9,823,509 B2 | 11/2017 | Chae et al. | |
| 10,041,653 B2 | 8/2018 | Ahn et al. | |
| 10,126,596 B2 * | 11/2018 | Kong | ............... G02F 1/133608 |

(Continued)

FOREIGN PATENT DOCUMENTS

| | | | |
|---|---|---|---|
| CN | 104765198 A | | 7/2015 |
| CN | 210514880 U | * | 5/2020 |

(Continued)

OTHER PUBLICATIONS

Communication dated Dec. 18, 2025 issued by the Korean Ministry of Intellectual Property in Korean Patent Application No. 10-2022-0063703.

*Primary Examiner* — Keith G. Delahoussaye
(74) *Attorney, Agent, or Firm* — Sughrue Mion, PLLC

(57) ABSTRACT

A light source apparatus includes an optical member, a substrate on a rear side of the optical member, a light source mounted on the substrate and configured to emit light, and a supporter between the optical member and the substrate and including a support body at one end of the supporter facing the substrate and mounted on the substrate, and an adsorption portion at another end of the supporter facing the optical member and configured to form an adsorption space having a pressure less than the pressure outside the supporter in a state in which the supporter supports the optical member.

15 Claims, 10 Drawing Sheets

(56)             References Cited

U.S. PATENT DOCUMENTS

| | | | |
|---|---|---|---|
| 10,642,100 | B2 | 5/2020 | Her et al. |
| 11,977,295 | B2 | 5/2024 | Yang et al. |
| 2011/0103040 | A1* | 5/2011 | Teragawa ......... G02F 1/133608 |
| | | | 362/223 |
| 2022/0082231 | A1* | 3/2022 | Chiu ..................... F21V 15/04 |

FOREIGN PATENT DOCUMENTS

| | | | |
|---|---|---|---|
| CN | 114236912 | A | 3/2022 |
| CN | 216212019 | U  * | 4/2022 |
| JP | 4074722 | B2 | 4/2008 |
| KR | 10-0713276 | B1 | 5/2007 |
| KR | 10-0849563 | B1 | 7/2008 |
| KR | 10-2009-0026043 | A | 3/2009 |
| KR | 10-2011-0056174 | A | 5/2011 |
| KR | 10-2014-0021358 | A | 2/2014 |
| KR | 10-2016-0046005 | A | 4/2016 |
| KR | 10-2017-0005537 | A | 1/2017 |
| KR | 10-2019-0074709 | A | 6/2019 |
| KR | 10-2237160 | B1 | 4/2021 |

* cited by examiner

1

DISPLAY APPARATUS AND LIGHT SOURCE APPARATUS THEREOF BOTH INCLUDING SUPPORTERS WITH ADSORPTION PORTION

CROSS-REFERENCE TO RELATED APPLICATIONS

This application is a continuation of International Application No. PCT/KR2023/004980, filed on Apr. 13, 2023, which is based on and claims priority to Korean Patent Application 10-2022-0063703, filed on May 24, 2022, in the Korean Intellectual Property Office, the disclosures of which are incorporated by reference herein in their entireties.

BACKGROUND

1. Field

The present disclosure relates to a display apparatus and a light source apparatus therefor, and more particularly to a display apparatus having an optical member and a light source apparatus thereof.

2. Description of the Related Art

In general, a display apparatus is a type of output device that converts acquired or stored electrical information into visual information and displays such information to a user, and is used in various fields such as homes and business.

Display apparatuses include monitor devices connected to personal computers (PCs) or server computers, portable computer devices, navigation terminal devices, conventional television (TV) devices, internet protocol television (IPTV) devices, handheld terminal devices such as smartphones, tablet PCs, personal digital assistants (PDAs), cellular phones, or the like, and various display apparatus used in industry to display an image, such as advertisements or movies, as well as various other types of audio/video systems.

To convert electrical information into visual information, a display apparatus includes a light source apparatus, wherein the light source apparatus includes a plurality of light sources for independently emitting light.

Each of the plurality of light sources includes, for example, a light emitting diode (LED) or an organic light emitting diode (OLED). For example, the LED or OLED may be mounted on a circuit board or substrate.

SUMMARY

Provided is a display apparatus that may be capable of reducing a change in an optical distance between a light source and an optical member and a light source apparatus thereof.

Provided is a display apparatus that may be capable of improving uniformity of image quality and a light source apparatus thereof.

Provided is a display apparatus that may be capable of improving strength and a light source apparatus thereof.

Provided is a display apparatus that may be capable of preventing breakage of an optical member and a light source apparatus thereof.

According to an aspect of the disclosure, a light source apparatus includes an optical member, a substrate on a rear side of the optical member, a light source mounted on the substrate and configured to emit light, and a supporter between the optical member and the substrate and including a support body at one end of the supporter facing the substrate and mounted on the substrate, and an adsorption portion at another end of the supporter facing the optical member and configured to form an adsorption space having a pressure less than the pressure outside the supporter in a state in which the supporter supports the optical member.

The adsorption portion may include a deformable material which may be deformed in the state in which the supporter supports the optical member.

The adsorption space may be between the adsorption portion and the optical member.

The supporter may be provided in a plurality, and a number of the plurality of supporters may be greater toward a center of the substrate than a number of the plurality of supporters towards an outer space of the substrate.

The adsorption portion may be made of a transparent or translucent material.

The supporter may further include a support portion extending between the support body and the adsorption portion.

A length of the support portion along a front-back direction of the light source apparatus may be greater than a length of the adsorption portion along the front-back direction of the light source apparatus.

The support portion may be made of the same material as the adsorption portion.

The support portion may be integrally formed with the support body and the adsorption portion.

A length of the support body along a front-back direction of the light source apparatus may be greater than a length of the adsorption portion along the front-back direction of the light source apparatus.

The support body may be made of the same material as the adsorption portion.

The adsorption portion may be configured to allow at least a portion of the light emitted from the light source to pass therethrough.

The optical member may include at least one of a diffusing plate, a diffusion sheet, a prism sheet, or a reflective polarizing sheet.

The adsorption portion may be made of silicone.

According to another aspect of the disclosure, a display apparatus includes a bottom chassis, a substrate on the bottom chassis, an optical member on a front side of the substrate, and a supporter between the optical member and the substrate and including a support body at one end of the supporter facing the substrate and mounted on the substrate, and an adsorption portion at another end of the supporter facing the optical member and configured to be adhered to the optical member, the adsorption portion being deformable such that a pressure difference between an inside and an outside of the adsorption portion is generated in a state in which the supporter supports the optical member.

The support may be configured to allow at least a portion of the light emitted from the light source to pass therethrough.

The supporter may further include a support portion extending between the support body and the adsorption portion, the support portion may be made of a transparent or translucent material.

The supporter may be configured to reduce a size of an adsorption space between the support and the optical member in a state in which the supporter is adhered to the optical member.

The supporter may be made of a transparent or translucent material.

According to another aspect of the disclosure, a display apparatus includes an optical member, a substrate on a rear side of the optical member, and a supporter between the optical member and the substrate and including a support body mounted on the substrate, and an adsorption portion configured to be adhered to the optical member by pressure.

According to various embodiments of the present disclosure, the display apparatus may reduce the changes in the optical distance because the supporter may be adsorbed to an optical member by an adsorption portion and the light source apparatus thereof.

Further, according to various embodiments of the present disclosure, the display apparatus may reduce the changes in the optical distance, thereby improving the uniformity of the image quality and the light source apparatus thereof.

Further, according to various embodiments of the present disclosure, the display apparatus may improve the strength because the supporter may be adsorbed to the optical member by the adsorption portion and the light source apparatus thereof.

Further, according to various embodiments of the present disclosure, the display apparatus may prevent breakage of the optical member because the optical member may be held on the adsorption portion and the light source apparatus thereof.

BRIEF DESCRIPTION OF DRAWINGS

Additional aspects will be set forth in part in the description which follows and, in part, will be apparent from the description, or may be learned by practice of the presented embodiments.

DETAILED DESCRIPTION

Figure 1:
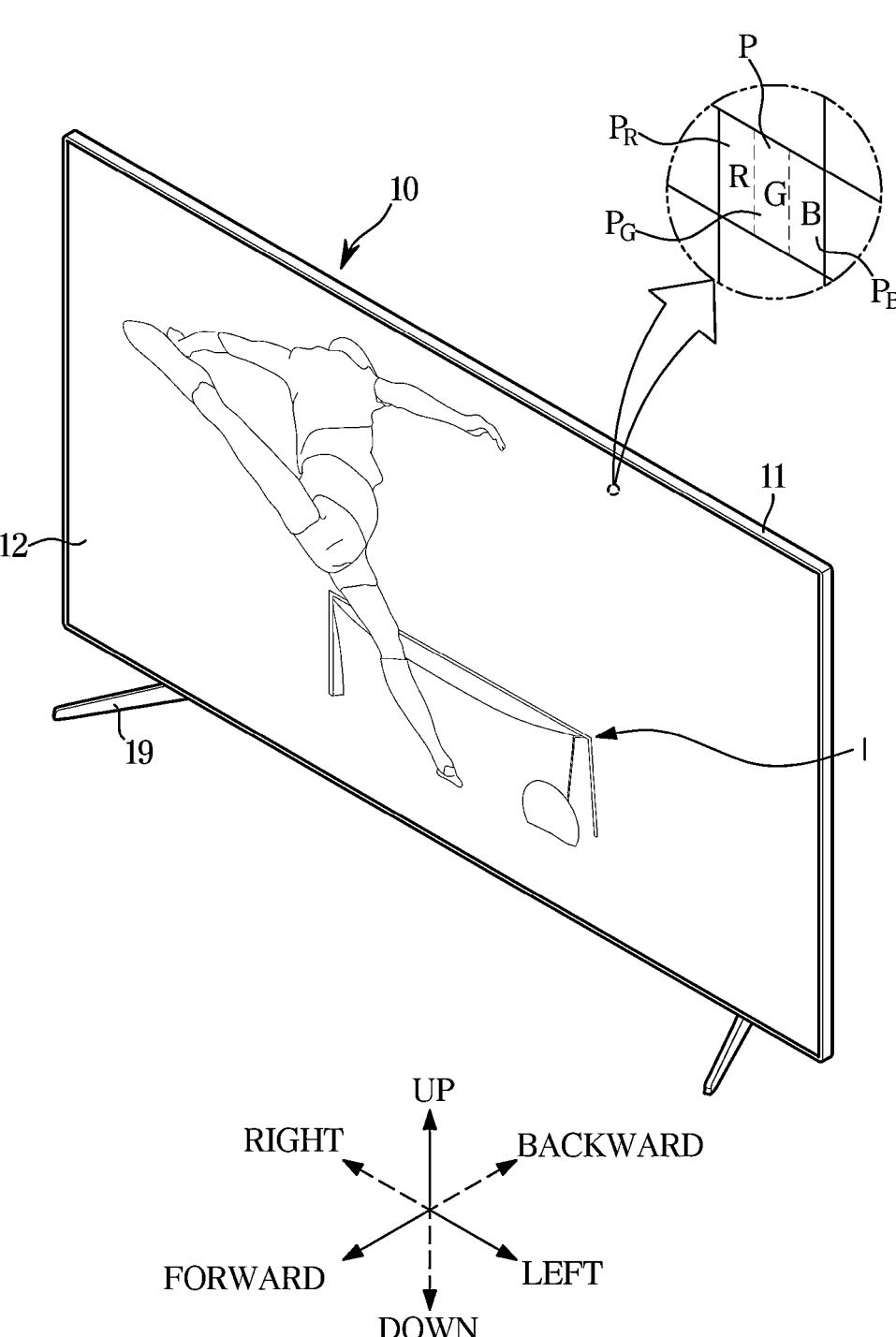
FIG. 1 illustrates an exterior of a display apparatus according to various embodiments of the present disclosure.

Throughout the specification, identical reference numerals refer to the same components. The disclosure is not intended to describe all elements of embodiments, and omissions are made that are common in the technical field to which the disclosure belongs or that are redundant between embodiments. As used herein, the term "part, unit, module, element, or block" may be implemented in software or hardware, and in accordance with embodiments, a plurality of "parts, units, modules, elements, or blocks" may be implemented as a single configuration, or a single "part, unit, module, element, or block" may comprise a plurality of configurations.

As used herein, whenever a part is referred to as being "connected" to another part, this may include not only direct connection, but also indirect connection, and indirect connection may include connection via a wireless communications network.

Also, whenever a part is referred to as being "include" another part, it is understood to include additional elements, not to exclude other elements, unless specifically stated otherwise.

When an element is referred to as being "on" another element, it may be directly on the other element or intervening elements may also be present.

It will be understood that, although the terms "first", "second", "primary", "secondary", etc., may be used herein to describe various elements, but elements are not limited by these terms. These terms are only used to distinguish one element from another element.

The singular forms "a," "an", and "the" are intended to include the plural forms as well, unless the context clearly indicates otherwise.

Throughout the specification, "A or B", "at least one of A and B", "at least one of A or B", "A, B or C", "at least one of A, B and C", and "at least one of A, B, or C" may each include any one or all the possible combinations of A, B and C.

The identification of the steps is for ease of description only, and the identification does not describe the order of the steps, and the steps may be performed in any order unless the context clearly indicates a particular order.

Hereinafter, various embodiments of the disclosure will be described in detail with reference to the accompanying drawings.

FIG. 1 illustrates an exterior of a display apparatus according to various embodiments of the present disclosure.

A display apparatus 10 may be a device capable of processing an image signal received from an external source and visually displaying the processed image. In the following, the display apparatus 10 shows a television (TV) as an example, but is not limited thereto. For example, the display apparatus 10 may be implemented in various forms, such as a monitor, a portable multimedia device, a portable communication device, and the like and the form of the display apparatus 10 is not limited as long as it is a device that visually displays an image.

In addition, the display apparatus 10 may be a large format display (LFD), which is installed outdoors, such as on the roof of a building or at a bus stop. Here, the outdoors is not necessarily limited to an outside, and the display apparatus 10 according to various embodiments may be installed in a subway station, a shopping mall, a movie theater, a company, a store, and the like, where a large number of people may come and go, even though indoors.

The display apparatus 10 may receive content data including video data and audio data from various content sources, and may output video and audio corresponding to the video data and audio data. For example, the display apparatus 10 may receive content data via a broadcast reception antenna or a wired cable, receive content data from a content playback device, or receive content data from a content delivery sever of a content provider.

As shown in FIG. 1, the display apparatus 10 may include a main body 11, a screen 12 that displays an image I, and a support 19 that is provided at a lower portion of the main body 11 and supports the main body 11.

The main body 11 may form the exterior of the display apparatus 10, and the interior of the main body 11 may be provided with components for the display apparatus 10 to display the image I or perform various functions. The main body 11 shown in FIG. 1 may have a flat plate shape, but the shape of the main body 11 may be not limited to that shown in FIG. 1. For example, the main body 11 may have a curved plate shape.

The screen 12 may be formed on a front surface of the main body 11 and may display the image I. For example, the screen 12 may display a still image or a movie. In addition, the screen 12 may display a two-dimensional (2D) flat image or a three-dimensional (3D) stereoscopic image using binocular parallax of the user.

A plurality of pixels P may be formed on the screen 12, and the image I displayed on the screen 12 may be formed by light emitted by each of the plurality of pixels P. For example, the light emitted by the plurality of pixels P may be combined, such as in a mosaic, to form the image I on the screen 12.

Each of the plurality of pixels P may emit light of different brightness and different colors. For example, each of the plurality of pixels P may include a self-emissive panel (e.g., a light emitting diode (LED) panel) capable of directly emitting light, or a non-emissive panel (e.g., a liquid crystal panel) capable of transmitting or blocking light emitted by a light source apparatus or the like.

To emit light of different colors, each of the plurality of pixels P may include sub-pixels $P_R$, $P_G$, and $P_B$.

The sub-pixels $P_R$, $P_G$, and $P_B$ may include a red sub-pixel $P_R$ capable of emitting red light, a green sub-pixel $P_G$ capable of emitting green light, and a blue sub-pixel $P_B$ capable of emitting blue light. For example, the red light may be representative of light having a wavelength of from about 620 nm (nanometer, one billionth of a meter) to 750 nm, the green light may be representative of light having a wavelength of from an about 495 nm to 570 nm, and the blue light may be representative of light having a wavelength of from an about 450 nm to 495 nm.

By combining the red light of the red sub-pixel $P_R$, the green light of the green sub-pixel $P_G$, and the blue light of the blue sub-pixel $P_B$, light of different s brightness and different colors may be emitted from each of the plurality of pixels P.

Figure 2:
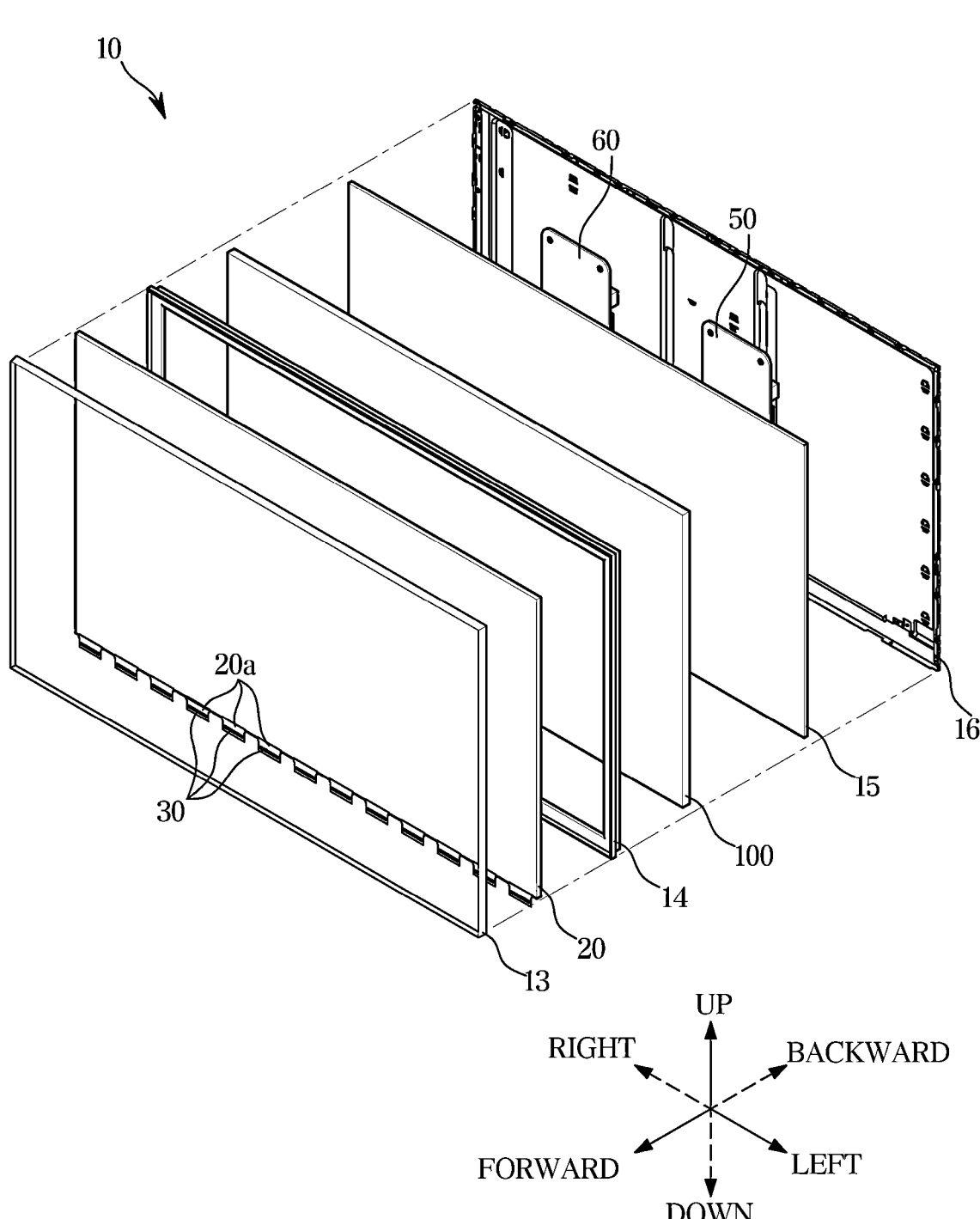
FIG. 2 is an exploded view of the display apparatus shown in FIG. 1 according to various embodiments of the present disclosure.
Figure 3:
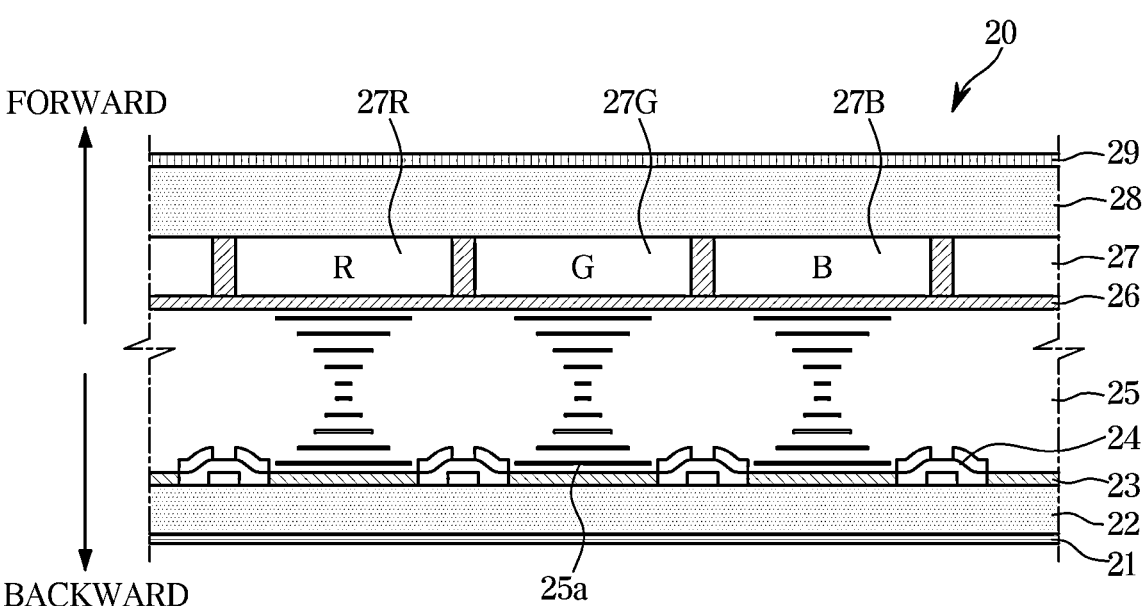
FIG. 3 is a side cross-sectional view of a liquid crystal panel of the display apparatus shown in FIG. 2 according to various embodiments of the present disclosure.

FIG. 2 is an exploded view of the display apparatus shown in FIG. 1. FIG. 3 is a side cross-sectional view of a liquid panel of the display apparatus shown in FIG. 2.

As shown in FIG. 2, various components for generating the image I on a screen S may be provided within the main body 11.

For example, the main body 11 may be provided with a light source apparatus 100 that is a surface light source, a liquid crystal panel 20 that blocks or transmits light emitted from the light source apparatus 100, a control assembly 50 that controls an operation of the light source apparatus 100 and the liquid crystal panel 20, and a power assembly 60 that supplies power to the light source apparatus 100 and the liquid crystal panel 20. In addition, the main body 11 may include a bezel 13, a frame middle mold 114, a bottom chassis 15, and a rear cover 16 for supporting and securing the liquid crystal panel 20, the light source apparatus 100, the control assembly 50, and the power assembly 60.

The liquid crystal panel 20 may be disposed on a front side of the light source apparatus 100 and may block or pass light emitted from the light source apparatus 100 to form the image I.

The front surface of the liquid crystal panel 20 may form the screen 12 of the display apparatus 10 described above, and the liquid crystal panel 20 may form the plurality of pixels P. The plurality of pixels P of the liquid crystal panel 20 may independently block or pass light from the light source apparatus 100, and the light passed by the plurality of pixels P may form the image I displayed on the screen 12.

For example, as shown in FIG. 3, the liquid crystal panel 20 may include a first polarizing film 21, a first transparent substrate 22, a pixel electrode 23, a thin film transistor (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the TFT 24, the liquid crystal layer 25, the common electrode 26, and the color filter 27. As such, the first and second transparent substrates 22 and 28 may be configured as tempered glass or transparent resin.

The first polarizing film 21 and the second polarizing film 29 may be provided on an outside of the first and second transparent substrates 22 and 28, respectively.

The first polarizing film 21 and the second polarizing film 29 may each allow defined light to pass through and block other light. For example, the first polarizing film 21 may pass light having a magnetic field oscillating in a first direction and block other light. In addition, the second polarizing film 29 may pass light having a magnetic field oscillating in a second direction and block other light. In this case, the first direction and the second direction may be orthogonal to each other. Accordingly, the polarization direction of the light passing through the first polarizing film 21 and the oscillation direction of the light passing through the second polarizing film 29 may be orthogonal to each other. As a result, light may generally not pass through the first polarizing film 21 and the second polarizing film 29 simultaneously.

The color filter 27 may be disposed on an inner side of the second transparent substrate 28.

The color filter 27 may include, for example, a red filter 27R that passes red light, a green filter 27G that passes green light, and a blue filter 27B that passes blue light, and the red filter 27R, the green filter 27G, and the blue filter 27B may be arranged in parallel with each other. A region in which the color filter 27 may be formed corresponds to the pixel P described above. The region in which the red filter 27R may be formed corresponds to the red sub-pixel $P_R$, the region in which the green filter 27G may be formed corresponds to the green sub-pixel $P_G$, and the region in which the blue filter 27B may be formed corresponds to the blue sub-pixel $P_B$.

The pixel electrode 23 may be provided on an inner side of the first transparent substrate 22, and the common electrode 26 may be provided the inner side of the second transparent substrate 28.

The pixel electrode 23 and the common electrode 26 may be formed of an electrically conductive metallic material and may generate an electric field to change the arrangement of liquid crystal molecules 25a constituting the liquid crystal layer 25 described below.

The pixel electrode 23 and the common electrode 26 may be formed of a transparent material and may allow light incident from the outside to pass through. For example, the pixel electrode 23 and the common electrode 26 may be formed of indium tin oxide (ITO), indium zinc oxide (IZO), silver (Ag) nanowire wire, carbon nanotube (CNT), graphene, or 3, 4-ethylenedioxythiophene (PEDOT), or the like.

The TFT 24 may be provided on the inner side of the second transparent substrate 22.

The TFT 24 may pass or block current flowing through the pixel electrode 23. For example, an electric field may be formed or removed between the pixel electrode 23 and the common electrode 26 in response to turning-on (closing) or turning-off (opening) of the TFT 24.

The TFT 24 may be made of polysilicon and may be formed by a semiconductor process, such as lithography, deposition, or ion implantation.

The liquid crystal layer 25 may be formed between the pixel electrode 23 and the common electrode 26, and the liquid crystal layer 25 may also be filled with the liquid crystal molecules 25a.

Liquid crystals are an intermediate state between a solid (crystal) and a liquid. Most liquid crystal materials are organic compounds, and their molecular shape is that of a thin, elongated rods, and where the arrangement of the molecules is irregular in some directions, but in other directions they may have the shape of a regular crystal. As a result, liquid crystals may have both the fluidity of a liquid and the optical anisotropy of a crystal (solid).

In addition, liquid crystals exhibit optical properties in response to changes in the electric field. For example, liquid crystals may change the orientation of the arrangement of molecules constituting the liquid crystal in response to changes in the electric field. When an electric field is generated in the liquid crystal layer 25, the liquid crystal molecules 25a of the liquid crystal layer 25 may be arranged according to the direction of the electric field, and when an electric field is not generated in the liquid crystal layer 25, the liquid crystal molecules 25a may be arranged irregularly or along an alignment film. As a result, the optical properties of the liquid crystal layer 25 may vary depending on the presence or absence of an electric field passing through the liquid crystal layer 25.

On one side of the liquid crystal panel 20, a cable 20a that transmits image data to the liquid crystal panel 20 and a display driver integrated circuit (DDI) 30 (hereinafter referred to as a driver IC) that processes digital image data and outputs an analog image signal may be provided.

The cable 20a may electrically connect the control assembly 50/power assembly 60 and the driver IC 30, and may also electrically connect the driver IC 30 and the liquid crystal panel 20. The cable 20a may include a flexible flat cable, a film cable, or the like that may be bent.

The driver IC 30 may receive image data and power from the control assembly 50/power assembly 60 via the cable 20a, and may transmit image data and drive current to the liquid crystal panel 20 via the cable 20a.

In addition, the cable 20a and the driver IC 30 may be implemented as a single unit, such as a film cable, a chip on film (COF), a tape carrier package (TCP), or the like. In other words, the driver IC 30 may be disposed on the cable 20a. However, the present disclosure is not limited thereto, and the driver IC 30 may be disposed on the liquid crystal panel 20.

The control assembly 50 may include a control circuitry (or circuit) to control the operation of the liquid crystal panel 20 and the light source apparatus 100. The control circuitry may process image data received from an external content source, transmit the image data to the liquid crystal panel 20, and transmit dimming data to the light source apparatus 100.

The power assembly 60 may supply power to the liquid crystal panel 20 and the light source apparatus 100 such that the light source apparatus 100 outputs surface light and the liquid crystal panel 20 blocks or passes light from the light source apparatus 100.

The control assembly 50 and the power assembly 60 may be implemented as a printed circuit board (PCB) and various circuitry mounted on the PCB. For example, the power circuitry may include capacitors, coils, resistors, processors, and the like, and the power circuit board on which they are mounted. In addition, the control circuitry may include memory, processors, and the control circuit boards on which they are mounted.

Figure 4:
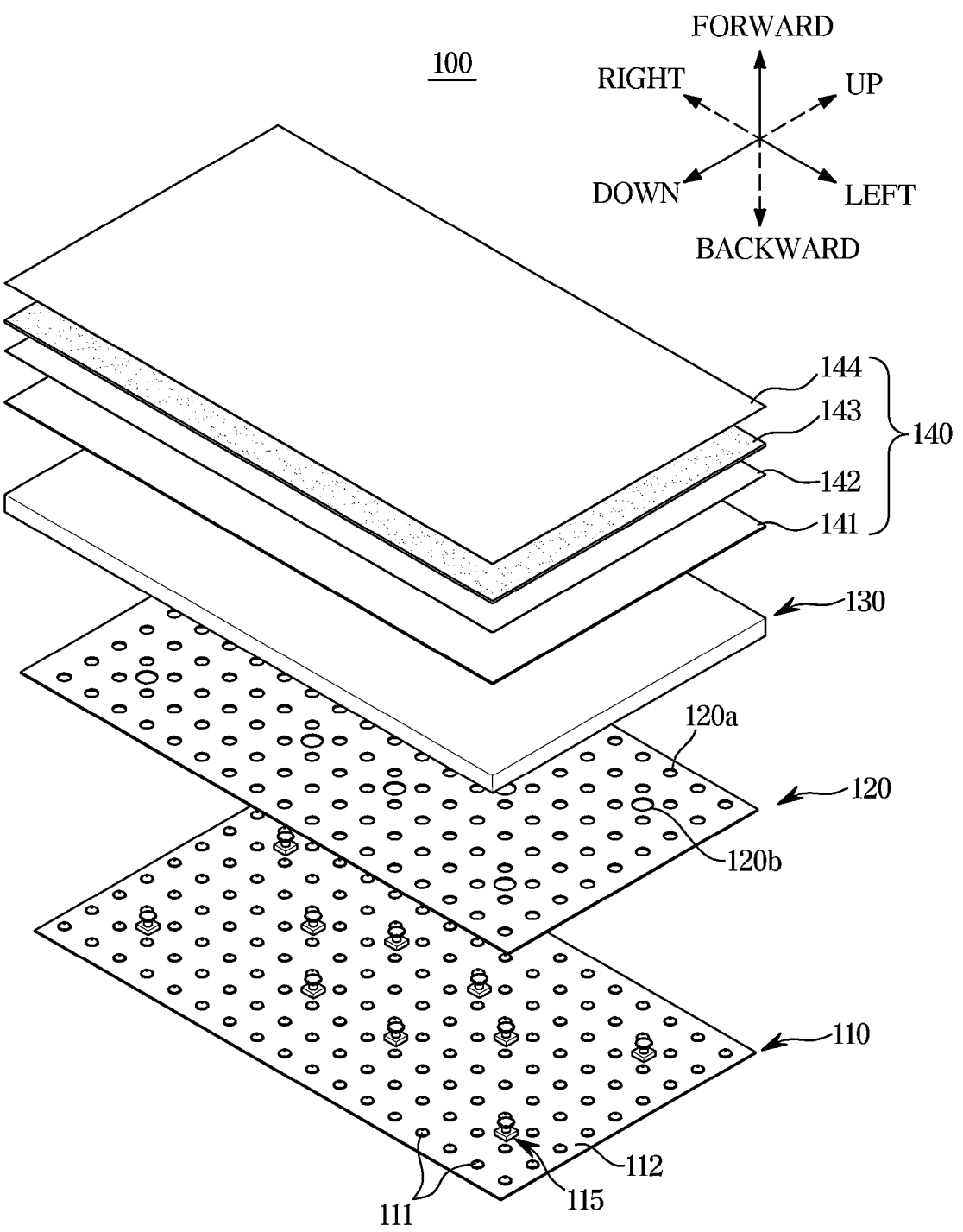
FIG. 4 is an exploded view of a light source apparatus shown in FIG. 2 according to various embodiments of the present disclosure.
Figure 5:
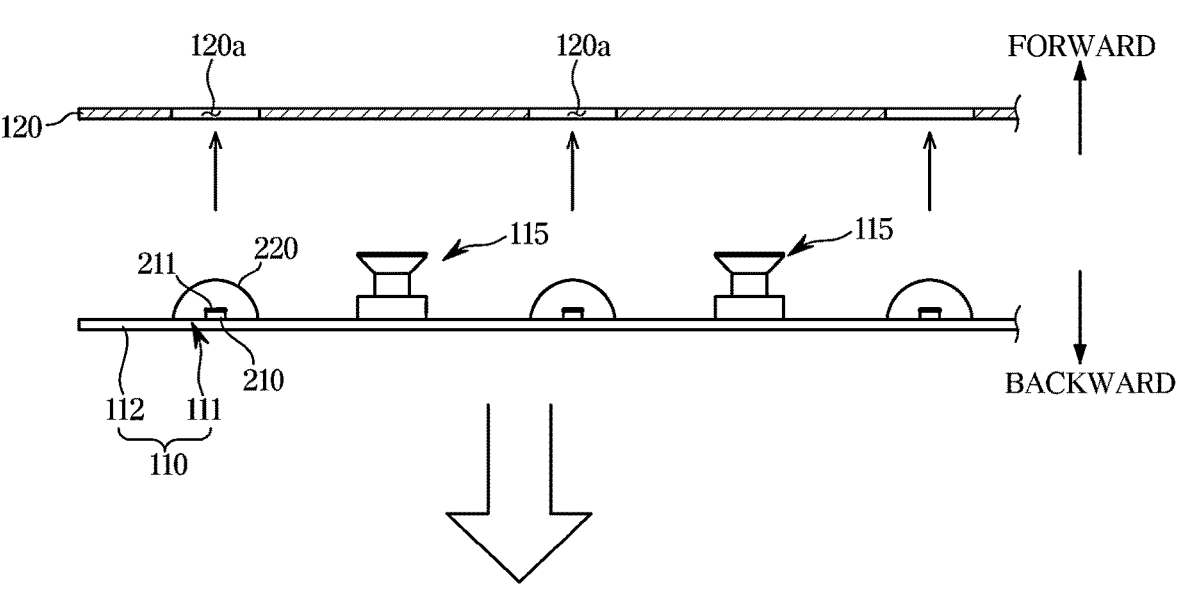
FIG. 5 is a view illustrating a coupling of a light source module and a reflective sheet included in the light source apparatus shown in FIG. 4 according to various embodiments of the present disclosure.
Figure 5:
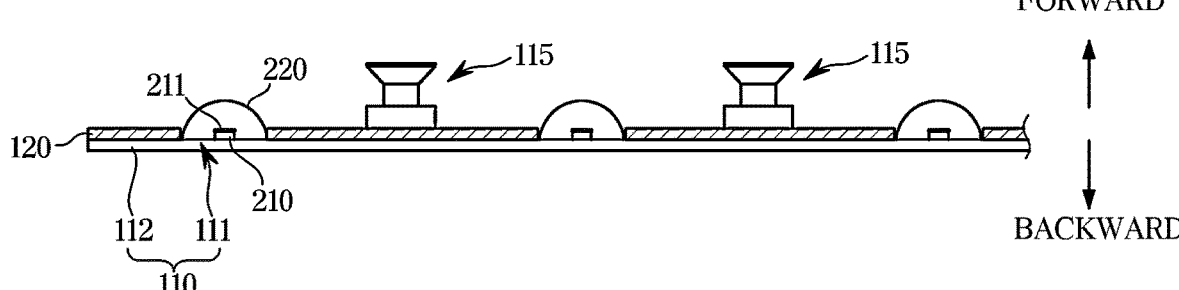

FIG. 4 is an exploded view of the light source apparatus shown in FIG. 2. FIG. 5 is a view illustrating a coupling of a light source module and a reflective sheet included in the light source apparatus shown in FIG. 4.

The light source apparatus 100 may include a point light source that emits monochromatic light or white light, and may refract, reflect, and scatter light to convert light emitted from the point light source into uniform surface light. For example, the light source apparatus 100 may include a plurality of light sources 111 that emit monochromatic light or white light, a diffusing plate 130 that diffuses light incident from the plurality of light sources 111, a reflective sheet 120 that reflects light emitted from the plurality of light sources 111 and a rear surface of the diffusing plate 130, and an optical sheet 140 that refracts and scatters light emitted from a front surface of the diffusing plate 130.

As such, the light source apparatus 100 may emit uniform surface light toward the front by refracting, reflecting, and scattering light emitted from the light sources.

The light source apparatus 100 may include a light source module 110 that generates light, the reflective sheet 120 that reflects light, the diffusing plate 130 that uniformly diffuses light, and the optical sheet 140 that enhances the luminance of the emitted light. The diffusing plate 130 and the optical sheet 140 may be referred to as optical members 130 and 140.

The light source module 110 may include the plurality of light sources 111 that emit light, and a substrate 112 that supports/secures the plurality of light sources 111.

The plurality of light sources 111 may be arranged in a predetermined pattern such that light of uniform luminance is emitted. The plurality of light sources 111 may be arranged so that a distance between one light source and adjacent light sources is equalized.

For example, as shown in FIG. 4, the plurality of light sources 111 may be arranged such that rows and columns are aligned. Accordingly, the plurality of light sources may be arranged such that an approximately square is formed by four adjacent light sources. In addition, one light source may be arranged adjacent to four light sources, and the distance between one light source and the four adjacent light sources may be approximately the same. The distance between the plurality of light sources 111 may be set to approximately 1 mm to 15 mm.

In another example, the plurality of light sources may be arranged in a plurality of rows, and one light source belonging to each row may be arranged at the center of two light sources belonging to adjacent rows. Accordingly, the plurality of light sources may be arranged such that an approximately equilateral triangle is formed by three adjacent light sources. In this case, one light source may be arranged adjacent to six light sources, and the distance between one light source and the six adjacent light sources may be approximately the same.

However, the pattern in which the plurality of light sources 111 are arranged may not be limited to the pattern described above, and the plurality of light sources 111 may be arranged in various patterns such that light of uniform luminance is emitted.

Each of the light sources 111 may employ an element capable of emitting monochromatic light (light of a specific wavelength, e.g., blue light) or white light (e.g., a mixed light of red, green, and blue light) in different directions when power is supplied. For example, the respective light source 111 may include an LED.

The substrate 112 may hold the plurality of light sources 111 such that the positions of the light sources 111 do not change. In addition, the substrate 112 may supply power to each of the light sources 111 so that the light sources 111 emit light. The substrate 112 may be disposed on a rear side of the optical members 130 and 140.

The substrate 112 may be configured as a synthetic resin or tempered glass or a PCB on which a conductive power supply line is formed to hold the plurality of light sources 111 and supply power to the light sources 111.

A supporter 115 may be installed on the substrate 112. The supporter 115 may be mounted on the substrate 112. The supporter 115 may be disposed between the optical members 130 and 140 and the substrate 112. The supporter 115 may support the configurations disposed on a front side of the reflective sheet 120. The supporter 115 may support the diffusing plate 130 and/or the optical sheet 140. The supporter 115 may extend from the substrate 112. The supporter 115 may extend between the substrate 112 and the diffusing plate 130.

The supporter 115 may be arranged to maintain an optical distance (OD) between the light source 111 and the diffusing plate 130 and/or the optical sheet 140, thereby maintaining optical properties of the light source apparatus 100. The supporter 115 may be arranged at a length to maintain the optical properties of the light source apparatus 100.

The supporters 115 may be provided in a plurality. The plurality of supporters 115 may be arranged such that the number of the supporters 115 is greater toward the center of the substrate than the number of the plurality of supporters 115 towards the outer space of the substrate 112. In other words, the plurality of supporters 115 may be arranged at a higher density toward the center of the substrate 112.

Detailed configurations of the supporters 115 will be described later.

The reflective sheet 120 may reflect light emitted from the plurality of light sources 111 in a forward direction or in a proximate forward direction.

The reflective sheet 120 may have a plurality of through holes 120a formed at positions corresponding to each of the plurality of light sources 111 of the light source module 110. In addition, the light sources 111 of the light source module 110 may pass through the through holes 120a and protrude forwardly of the reflective sheet 120. The light sources 111 may be positioned in the through holes 120a.

For example, as shown in an upper side of FIG. 5, during assembly process of the reflective sheet 120 and the light source module 110, the plurality of light sources 111 of the light source module 110 may be inserted into the plurality of through holes 120a formed in the reflective sheet 120. As a result, as shown in a lower side of FIG. 5, the substrate 112 of the light source module 110 may be positioned on a rear side of the reflective sheet 120, but at least a portion of the plurality of light sources 111 of the light source module 110 may be positioned on the front side of the reflective sheet 120.

Accordingly, the plurality of light sources 111 may emit light from the front side of the reflective sheet 120.

The reflective sheet 120 may have a plurality of support holes 120b at positions corresponding to the supporters 115. The supporters 115 may protrude through the support holes 120b to support the diffusing plate 130 and/or the optical sheet 140. The supporters 115 may be positioned in the support holes 120b.

The plurality of light sources 111 may emit light in different directions from the front side of the reflective sheet 120. The light may be emitted from the light sources 111 toward the diffusing plate 130 as well as from the light sources 111 toward the reflective sheet 120, and the reflective sheet 120 may reflect the light emitted toward the reflective sheet 120 toward the diffusing plate 130.

The light emitted from the light sources 111 may pass through various objects, including the diffusing plate 130 and the optical sheet 140. As the light passes through the diffusing plate 130 and the optical sheet 140, a portion of the incident light may be reflected from the surfaces of the diffusing plate 130 and the optical sheet 140. The reflective sheet 120 may reflect the light reflected from the diffusing plate 130 and the optical sheet 140.

The diffusing plate 130 may be disposed in front of the light source module 110 and the reflective sheet 120, and may uniformly distribute the light emitted from the light sources 111 of the light source module 110.

As described above, the plurality of light sources 111 may be positioned throughout a rear surface of the light source apparatus 100. Although the plurality of light sources 111 are positioned at equal intervals on the rear surface of the light source apparatus 100, unevenness in luminance may occur depending on the location of the plurality of light sources 111.

The diffusing plate 130 may diffuse the light emitted from the plurality of light sources 111 within the diffusing plate 130 to eliminate unevenness in luminance caused by the plurality of light sources 111. In other words, the diffusing plate 130 may uniformly emit uneven light from the plurality of light sources 111 to the front.

The optical sheet 140 may include a variety of sheets to improve luminance and uniformity of luminance. For example, the optical sheet 140 may include a diffusion sheet 141, a first prism sheet 142, a second prism sheet 143, and a reflective polarizing sheet 144.

The diffusion sheet 141 may diffuse light to ensure uniformity of luminance. Light emitted from the light sources 111 may be diffused by the diffusing plate 130 and may be diffused again by the diffusion sheet 141 included in the optical sheet 140.

The first and second prism sheets 142 and 143 may increase luminance by concentrating the light diffused by the diffusion sheet 141. The first and second prism sheets 142 and 143 may include a prism pattern in the shape of a triangular prism, and the prism pattern may be provided in a plurality, which are arranged adjacently to each other, to form a plurality of band shapes.

The reflective polarizing sheet 144 may be a type of polarizing film capable of transmitting a portion of the incident light and reflecting other portions in order to improve luminance. For example, the reflective polarizing sheet 144 may transmit polarized light in the same direction as a predetermined polarization direction of the reflective polarizing sheet 144 and reflect polarized light in a different direction from the predetermined polarization direction of the reflective polarizing sheet 144. In addition, the light reflected by the reflective polarizing sheet 144 may be recycled within the light source apparatus 100, and thus the luminance of the display apparatus 10 may be improved by such light recycling.

The optical sheet 140 may not be limited to the sheet or film shown in FIG. 4, and may include a variety of other sheets or films, such as a protective sheet.

The light source apparatus 100 may include at least one of the diffusing plate 130, the diffusion sheet 141, the first prism sheet 142, the second prism sheet 143, and the reflective polarizing sheet 144.

Figure 6:
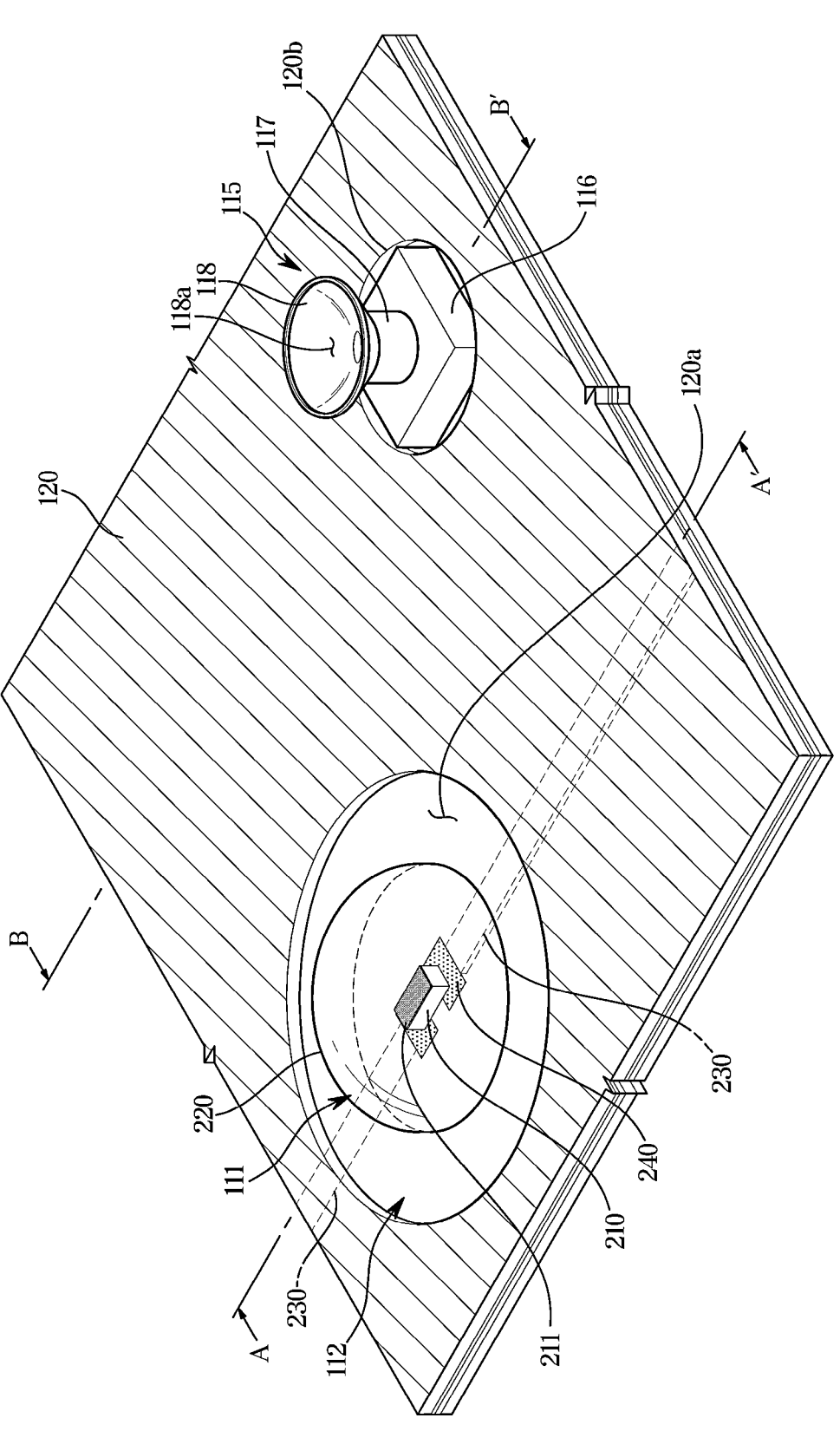
FIG. 6 is an enlarged view of the light source and a supporter of the light source apparatus shown in FIG. 4 according to various embodiments of the present disclosure.
Figure 7:
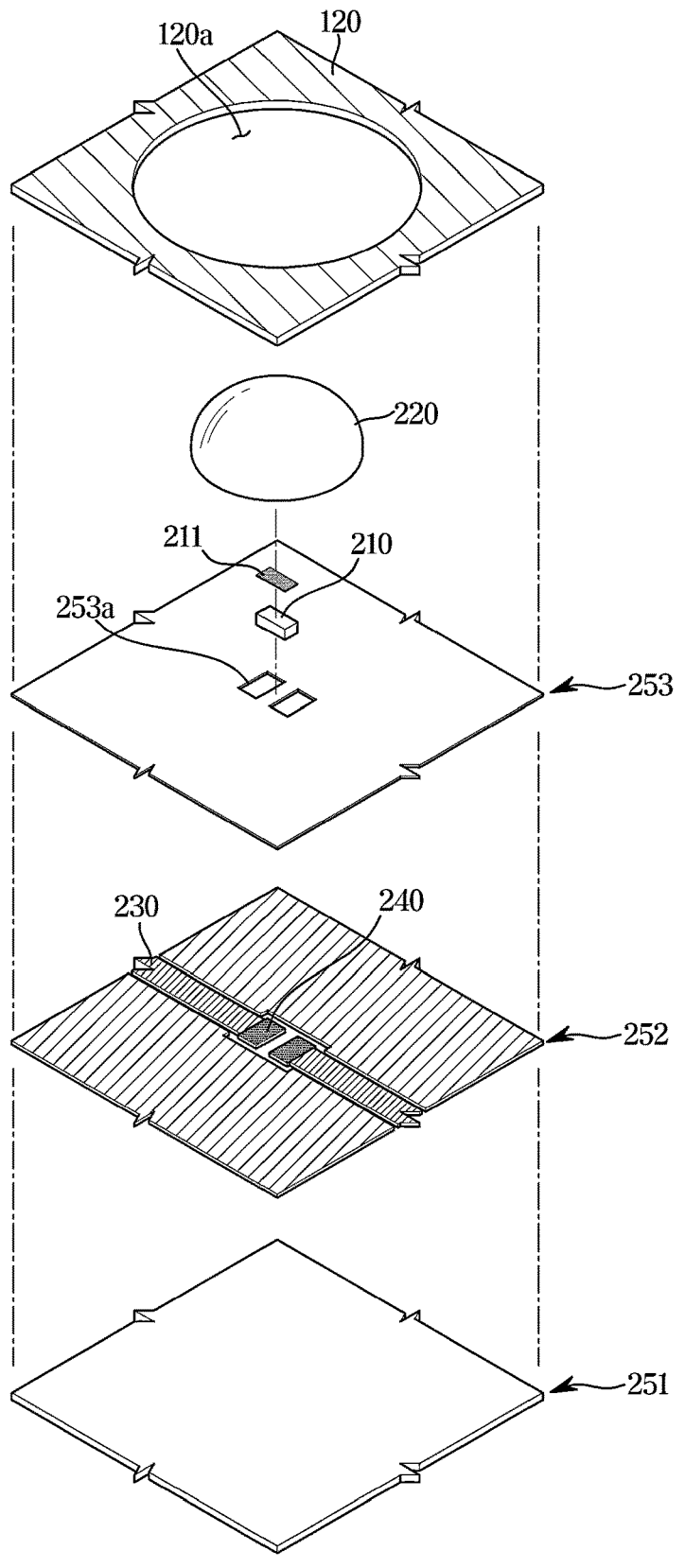
FIG. 7 is an exploded view of the light source shown in FIG. 6 according to various embodiments of the present disclosure.
Figure 8:
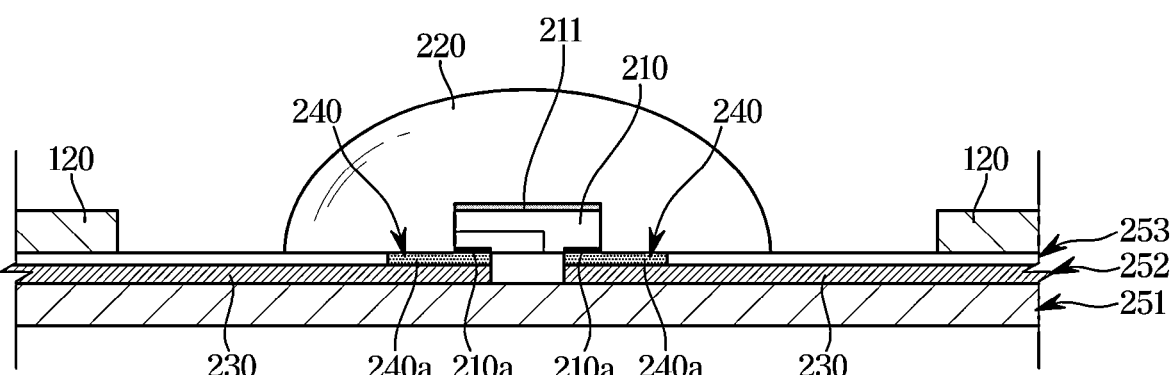
FIG. 8 is a cross-sectional view taken along the line A-A' shown in FIG. 6 according to various embodiments of the present disclosure.

FIG. 6 is an enlarged view of the light source and the supporter of the light source apparatus shown in FIG. 4. FIG. 7 is an exploded view of the light source shown in FIG. 6. FIG. 8 is a cross-section view taken along the line A-A' shown in FIG. 6.

Referring to FIGS. 6 to 8, the light source 111 and the supporter 115 of the light source apparatus 100 will be described.

As described above, the light source module 110 may include the plurality of light sources 111. The plurality of light sources 111 may protrude from the rear side of the reflective sheet 120 through the through hole 120a and toward the front side of the reflective sheet 120. Accordingly, as shown in FIGS. 6 and 7, the light sources 111 and the substrate 112 may be partially exposed to the front side of the reflective sheet 120 through the through hole 120a.

Each of the light sources 111 may include electrical/mechanical structures positioned in a region defined by the through hole 120a of the reflective sheet 120.

Each of the plurality of light sources 111 may include a light-emitting diode 210, an optical dome 220, and a reflective layer 211.

The light-emitting diode 210 may include a P-type semiconductor and an N-type semiconductor for emitting light by recombination of holes and electrons. In addition, the light-emitting diode 210 may also be provided with a pair of electrodes 210a for supplying holes and electrons to the P-type semiconductor and the N-type semiconductor, respectively.

The light-emitting diode 210 may convert electrical energy into light energy. In other words, the light-emitting diode 210 may emit light having a maximum intensity at a predetermined wavelength to which power is supplied. For example, the light-emitting diode 210 may emit blue light having a peak value at a wavelength representative of blue color (e.g., a wavelength between 430 nm and 495 nm).

The light-emitting diode 210 may be directly attached to the substrate 112 in a chip on board (COB) manner. In other words, the light source 111 may include the light-emitting diode 210 in which a light-emitting diode chip or a light-emitting diode die is directly attached to the substrate 112 without separate packaging.

To miniaturize the light source 111, the light source module 110 in which a flip-chip type light-emitting diode 210 is attached to the substrate 112 in the COB manner may be manufactured.

A power supply line 230 and a power supply pad 240 may be provided on the substrate 112 to supply power to the flip-chip type light-emitting diode 210.

The power supply line 230 may be provided on the substrate 112 to supply electrical signals and/or power from the control assembly 50 and/or the power assembly 60 to the light-emitting diode 210.

As shown in FIGS. 7 and 8, the substrate 112 may be formed by alternately laminating a non-conductive insulation layer 251 and a conductive conduction layer 252. The conduction layer 252 may be disposed between the insulation layer 251 and a protective layer 253.

The conduction layer 252 may be formed with lines or patterns through which power and/or electrical signals pass. The conduction layer 252 may be formed from a variety of materials having an electrical conductivity. For example, the conduction layer 252 may be formed of various metallic materials, such as copper (Cu) or tin (Sn) or aluminum (Al) or alloys thereof.

The dielectric of the insulation layer 251 may insulate between the lines or patterns of the conduction layer 252. The insulation layer 251 may be formed of a dielectric for electrical insulation, such as FR-4.

The power supply line 230 may be implemented by lines or patterns formed in the conduction layer 252.

The power supply line 230 may be electrically connected to the light-emitting diode 210 via the power supply pad 240. The power supply pad 240 may be formed by exposing the power supply line 230 to the outside.

The protective layer 253 may be formed on the substrate 112 to prevent and/or reduce damage to the substrate 112 by external impact and/or damage by chemical action (e.g., corrosion, etc.) and/or damage by optical action. The protective layer 253 may be provided on one side of the substrate 112 facing the light source 111. The protective layer 253 may include a photo solder resist (PSR).

As shown in FIG. 8, the protective layer 253 may cover the power supply line 230 to prevent the power supply line 230 from being exposed to the outside.

To make electrical contact between the power supply line 230 and the light-emitting diode 210, a window 253a may be formed in the protective layer 253 to expose a portion of the power supply line 230 to the outside. The portion of the power supply line 230 exposed to the outside by the window 253a of the protective layer 253 may form the power supply pad 240.

A conductive adhesive material 240a may be applied to the power supply pad 240 for electrical contact between the power supply line 230 and the electrodes 210a of the light-emitting diode 210 exposed to the outside. The conductive adhesive material 240a may be applied within the window 253a of the protective layer 253. The window 253a may be formed so that the power supply pad 240 and the light-emitting diode 210 are in electrical contact.

The electrodes 210a of the light-emitting diode 210 may be in contact with the conductive adhesive material 240a, and the light-emitting diode 210 may be electrically connected to the power supply line 230 via the conductive adhesive material 240a.

The conductive adhesive material 240a may include, for example, a solder that is electrically conductive. However, the present disclosure is not limited thereto, and the conductive adhesive material 240a may include an electrically conductive epoxy adhesive.

Power may be supplied to the light-emitting diode 210 via the power supply line 230 and the power supply pad 240, and the light-emitting diode 210 may emit light when power is supplied. A pair of power supply pads 240 may be provided corresponding to each of the pair of electrodes 210a provided in the flip-chip type light-emitting diode 210.

The optical dome 220 may cover the light-emitting diode 210. The optical dome 220 may prevent or reduce damage to the light-emitting diode 210 by external mechanical action and/or damage to the light-emitting diode 210 by chemical action, etc. The optical dome 220 may be arranged to be spaced apart from the reflective sheet 120.

The optical dome 220 may have, for example, a domed shape in which a sphere is cut by a side that does not include its center, or a hemispherical shape in which a sphere is cut by a side that includes its center. The vertical cross-section of the optical dome 220 may, for example, have an arc shaped or a semicircular shape.

The optical dome 220 may be formed from a silicone or epoxy resin. For example, molten silicone or epoxy resin may be injected onto the light-emitting diode 210 through a nozzle or the like, and then the injected silicone or epoxy resin may be cured to form the optical dome 220.

Thus, the optical dome 220 may vary in shape depending on the viscosity of silicone or epoxy resin in the liquid phase. For example, in the case where the optical dome 220 is manufactured using silicone having a thixotropic index of approximately 2.7 to 3.3 (preferably 3.0), the optical dome 220 may be formed with a dome ratio, which is the ratio of the height of the dome relative to the diameter of a bottom surface of the dome (height of the dome/diameter of the bottom surface), of approximately 0.25 to 0.31 (preferably 0.28). For example, the optical dome 220 made of silicone having a thixotropic index of approximately 2.7 to 3.3 (preferably 3.0) may have a bottom surface diameter of approximately 2.5 mm and a height of approximately 0.7 mm.

The optical dome 220 may be optically transparent or translucent. The light emitted from the light-emitting diode 210 may pass through the optical dome 220 and be emitted to the outside.

In this case, the dome-shaped optical dome 220 may refract light like a lens. For example, light emitted from the light-emitting diode 210 may be refracted by the optical dome 220, thereby dispersing the light.

As such, the optical dome 220 may disperse the light emitted from the light-emitting diode 210 in addition to protecting the light-emitting diode 210 from external mechanical action and/or chemical action or electrical action.

The reflective layer 211 may be positioned in front of the light-emitting diode 210. The reflective layer 211 may be disposed on a front surface of the light-emitting diode 210. The reflective layer 211 may be a multilayer reflective structure in which a plurality of insulating films having different refractive indices are alternately laminated. For example, such a multilayer reflective structure may be a distributed Bragg reflector (DBR) in which a first insulating film having a first refractive index and a second insulating film having a second refractive index are alternately laminated.

The supporter 115 may be arranged to be adsorbed and secured to the optical members 130 and 140 by pressure. In other words, the supporter 115 may be configured to be adhered to the optical members 130 and 140 by pressure such that the supporter 115 is secured to the optical members 130 and 140. The supporter 115 may include a support body 116, a support portion 117, and an adsorption portion 118.

The support body 116 may be positioned at one end of the supporter 115 facing the substrate 112. The support body 116 may be installed on the substrate 112. The support body 116 may be mounted on the substrate 112.

The support body 116 may support the diffusing plate 130 and/or the optical sheet 140 disposed in front of the reflective sheet 120. The support body 116 may include a material having a rigidity to support the diffusing plate 130 and/or the optical sheet 140 disposed in front of the reflective sheet

14

120. The support body 116 may include silicone. The support body 116 may be made of an epoxy material having a hardness. The support body 116 may include the same material as the support portion 117 and the adsorption portion 118.

The support body 116 may be made of a white color having a relatively high reflectivity to prevent moire from forming in the display apparatus 10. The support body 116 may include a transparent or translucent material. The support body 116 may be optically transparent or translucent. Light emitted from the light-emitting diode 210 may pass through the support body 116.

The support body 116 may have an approximately square column shape. The length of the support body 116 along the direction from the substrate 112 to the optical members 130 and 140 may be formed to be longer than the length of the adsorption portion 118 along the direction from the substrate 112 to the optical members 130 and 140. In other words, the length of the support body 116 in a front-to-back direction may be formed to be longer than the length of the adsorption portion 118 in the front-to-back direction.

The support portion 117 may be disposed on one side of the support body 116 facing the optical members 130 and 140. The support portion 117 may extend from the support body 116 toward the optical members 130 and 140.

The support portion 117 may support the diffusing plate 130 and/or the optical sheet 140 disposed in front of the reflective sheet 120. The support portion 117 may include a material having a rigidity to support the diffusing plate 130 and/or the optical sheet 140 disposed in front of the reflective sheet 120. The support portion 117 may include silicone. The support portion 117 may include the same material as the support body 116 and the adsorption portion 118. The support portion 117 may include a transparent or translucent material. The support portion 117 may be optically transparent or translucent. Light emitted from the light-emitting diode 210 may pass through the support portion 117.

The support portion 117 may have an approximately cylindrical shape. The support portion 117 may extend between the support body 116 and the adsorption portion 118.

The adsorption portion 118 may be positioned at the other end of the supporter 115 facing the optical members 130 and 140. The adsorption portion 118 may be positioned at a front end of the support portion 117. The adsorption portion 118 may be positioned at one end of the support portion 117 facing the optical members 130 and 140. The adsorption portion 118 may be positioned at one end of the support portion 117 facing the diffusing plate 130.

The adsorption portion 118 may be arranged to be adsorbed with the optical members 130 and 140 disposed in front of the reflective sheet 120 when the optical members 130 and 140 are seated on the supporter 115. The adsorption portion 118 may include silicone. The adsorption portion 118 may be made of an epoxy resin.

The adsorption portion 118 may include a transparent or translucent material. The adsorption portion 118 may be optically transparent or translucent. At least a portion of the light emitted from the light-emitting diode 210 may pass through the adsorption portion 118.

The adsorption portion 118 may form an adsorption space 118*a* for adsorption with the optical members 130 and 140. The adsorption portion 118 may include the adsorption space 118*a* having a pressure less than the pressure outside the supporter 115 in a state in which the supporter 115 supports the optical members 130 and 140. The adsorption space 118*a* may be formed between the adsorption portion 118 and the optical members 130 and 140.

The adsorption portion 118 may include a deformable material which may be deformed in a state in which the supporter 115 supports the optical members 130 and 140.

When the optical members 130 and 140 contact the supporter 115 and move toward the supporter 115, the air inside the adsorption space 118*a* may move to the outside. As a result, the supporter 115 may be adsorbed to the optical members 130 and 140 by the difference between the pressure inside the adsorption space 118*a* and the pressure outside. The adsorption portion 118 may be formed such that the cross-sectional area perpendicular to the optical distance between the light source 111 and the optical members 130 and 140 increases as it moves from the support portion 117 toward the optical members 130 and 140. The adsorption portion 118 may have an approximate conical shape.

The supporter 115 may be formed integrally with the support body 116, the support portion 117, and the adsorption portion118, and may be configured to include silicone.

The length of the support portion 117 along the direction from the substrate 112 to the optical members 130 and 140 may be formed to be greater than the length of the adsorption portion 118 along the direction from the substrate 112 to the optical members 130 and 140. In other words, the length of the support portion 117 in the front-to-back direction may be formed to be longer than the length of the adsorption portion 118 in the front-to-back direction.

In such a configuration, the display apparatus 10 according to various embodiments of the present disclosure may secure the optical members 130 and 140 to the supporter 115 in a relatively simple configuration, thereby minimizing the changes in the optical distance, and by minimizing the changes in the optical distance, the uniformity of the image quality may be ensured and moire may be improved. In addition, the display apparatus 10 according to various embodiments of the present disclosure may secure the optical members 130 and 140 to the supporter 115, so that the strength may be increased and the optical members 130 and 140 may be prevented from being damaged.

Figure 9:
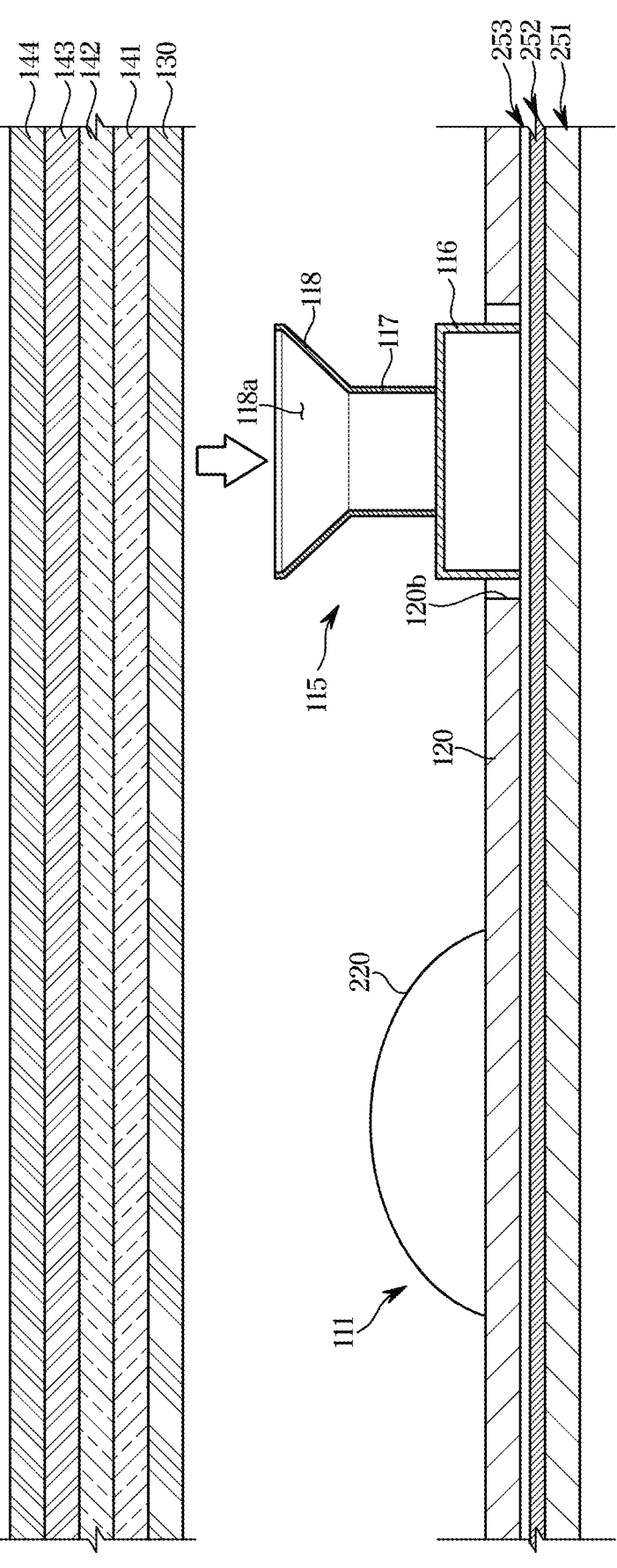
FIG. 9 is a cross-sectional view taken along the line B-B' shown in FIG. 6, showing a process in which an optical member is supported on the supporter according to various embodiments of the present disclosure.
Figure 10:
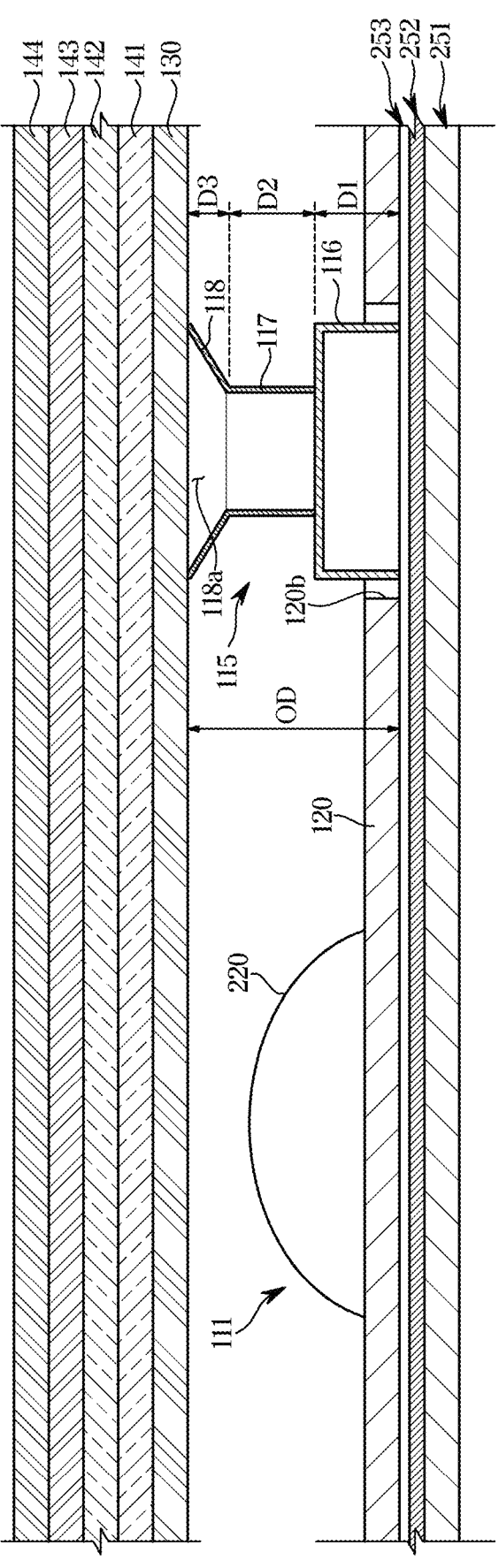
FIG. 10 is a view illustrating the optical member shown in FIG. 9 supported on the supporter according to various embodiments of the present disclosure.

FIG. 9 is a cross-sectional view taken along the line B-B' shown in FIG. 6, showing a process in which the optical member is supported on the supporter. FIG. 10 shows a state in which the optical member shown in FIG. 9 is supported on the supporter.

Referring to FIGS. 9 and 10, the process by which the optical members 130 and 140 are adsorbed onto the supporter 115 will be described.

First, referring to FIG. 9, the support body 116 may be mounted on the substrate 112. The optical members 130 and 140 may be provided in front of the support body 116.

Referring to FIG. 10, the optical members 130 and 140 may be supported by contacting the adsorption portion 118 of the supporter 115. As the optical members 130 and 140 approach the supporter 115, the air inside the adsorption space 118*a* may move to the outside. Accordingly, an end of the adsorption portion 118 close to the optical members 130 and 140 may be deformed to move away from the center of the supporter 115. In other words, the supporter 115 may be deformed to reduce the size of the adsorption space 118*a*. As a result, a pressure difference may occur between the inside and the outside of the adsorption space 118*a*, and the optical members 130 and 140 may be adsorbed onto the supporter 115. The pressure inside the adsorption space 118*a* may become smaller than the pressure outside the adsorption space 118*a*, and thus, the supporter 115 may be adsorbed and held by the optical members 130 and 140.

The supporter 115 may be provided with a length corresponding to the OD between the light source 111 and the optical members 130 and 140. A length D1 of the support body 116 may be provided similar to a length D2 of the support portion 117. A length D3 of the adsorption portion 118 may be provided shorter than the length D1 of the support body 116 and the length D2 of the support portion 117.

For example, the OD may be set to approximately 3 mm, and correspondingly, the supporter 115 may be arranged to have a length of approximately 3 mm. For example, the length D1 of the support body 116 may be set to have a length of approximately 1 mm to 1.5 mm, the length D2 of the support portion 117 may be set to have a length of approximately 1 mm to 1.5 mm, and the length D3 of the adsorption portion 118 may be set to have a length of approximately 0.5 mm. The length D3 of the adsorption portion 118 may have a length of 0.5 mm or less.

Although certain exemplary embodiments are illustrated and described above, the present disclosure is not limited to the certain embodiments, various applications may of course be performed by those skilled in the art without deviating from what is claimed in the scope of claims, and such applications should not be understood separately from the technical idea or prospects herein.

What is claimed is:

1. A light source apparatus comprising:
an optical member;
a substrate on a rear side of the optical member;
a reflective sheet on the substrate and comprising at least one support hole therein, wherein the at least one support hole is configured to expose a top surface of the substrate therethrough;
a light source mounted on the substrate and configured to emit light; and
a supporter between the optical member and the substrate and comprising:
a support body at one end of the supporter facing the substrate and mounted on the substrate, wherein the support body has a white color and/or is reflective; and
an adsorption portion at another end of the supporter facing the optical member and configured to form an adsorption space having a pressure less than the pressure outside the supporter in a state in which the supporter supports the optical member,
wherein the support body is in the at least one support hole.

2. The light source apparatus of claim 1, wherein the adsorption portion comprises a deformable material which is deformed in the state in which the supporter supports the optical member.

3. The light source apparatus of claim 1, wherein the adsorption space is between the adsorption portion and the optical member.

4. The light source apparatus of claim 1, wherein the supporter is provided in a plurality, and
a number of the plurality of supporters is greater toward a center of the substrate than a number of the plurality of supporters towards an outer space of the substrate.

5. The light source apparatus of claim 1, wherein the adsorption portion is made of a transparent or translucent material.

6. The light source apparatus of claim 1, wherein the supporter further comprises a support portion extending between the support body and the adsorption portion.

7. The light source apparatus of claim 6, wherein a length of the support portion along a front-back direction of the light source apparatus is greater than a length of the adsorption portion along the front-back direction of the light source apparatus.

8. The light source apparatus of claim 6, wherein the support portion is made of the same material as the adsorption portion.

9. The light source apparatus of claim 6, wherein the support portion is integrally formed with the support body and the adsorption portion.

10. The light source apparatus of claim 1, wherein a length of the support body along a front-back direction of the light source apparatus is greater than a length of the adsorption portion along the front-back direction of the light source apparatus.

11. The light source apparatus of claim 1, wherein the support body is made of the same material as the adsorption portion.

12. The light source apparatus of claim 1, wherein the adsorption portion is configured to allow at least a portion of the light emitted from the light source to pass therethrough.

13. The light source apparatus of claim 1, wherein the optical member comprises at least one of a diffusing plate, a diffusion sheet, a prism sheet, or a reflective polarizing sheet.

14. The light source apparatus of claim 1, wherein the adsorption portion is made of silicone.

15. A display apparatus comprising:
a bottom chassis;
a substrate on the bottom chassis;
an optical member on a front side of the substrate;
a reflective sheet on the substrate and comprising at least one support hole therein, wherein the at least one support hole is configured to expose a top surface of the substrate therethrough; and
a supporter between the optical member and the substrate and comprising:
    a support body at one end of the supporter facing the substrate and mounted on the substrate, wherein the support body has a white color and/or is reflective; and
    an adsorption portion at another end of the supporter facing the optical member and configured to be adhered to the optical member, the adsorption portion being deformable such that a pressure difference between an inside and an outside of the adsorption portion is generated in a state in which the supporter supports the optical member,
wherein the support body is in the at least one support hole.

* * * * *